*(12)* United States Patent
Beier et al.

*(10)* Patent No.: US 12,128,635 B2
*(45)* Date of Patent: Oct. 29, 2024

(54) JOINING METHOD AND ASSEMBLY FOR AN AIRCRAFT

(71) Applicant: Airbus (S.A.S.), Blagnac (FR)

(72) Inventors: Uwe Beier, Höhenkirchen-Siegertsbrunn (DE); Christian Metzner, Gmund (DE); Thomas Meer, Glonn (DE)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 18/204,167

(22) Filed: May 31, 2023

(65) Prior Publication Data

US 2023/0321926 A1 Oct. 12, 2023

Related U.S. Application Data

(63) Continuation of application No. 17/219,228, filed on Mar. 31, 2021, now Pat. No. 11,697,251.

(30) Foreign Application Priority Data

Apr. 7, 2020 (DE) ...................... 10 2020 109 740.9

(51) Int. Cl.
*B29C 65/00* (2006.01)
*B29C 65/02* (2006.01)
*B33Y 80/00* (2015.01)
*B29L 31/30* (2006.01)

(52) U.S. Cl.
CPC ............ *B29C 66/721* (2013.01); *B29C 65/02* (2013.01); *B29C 66/1122* (2013.01);
(Continued)

(58) Field of Classification Search
CPC . B29C 66/341; B29C 66/721; B29C 66/1122; B29C 66/7392;
(Continued)

(56) References Cited

U.S. PATENT DOCUMENTS

| 8,211,268 B1 | 7/2012 | Raghavendran |
| 9,643,382 B2 | 5/2017 | Eleazer |

(Continued)

FOREIGN PATENT DOCUMENTS

| DE | 102013107849 A1 | 1/2015 |
| DE | 102019106446 A1 | 9/2020 |

(Continued)

OTHER PUBLICATIONS

German Search Report for Application No. 102020109740 dated Nov. 13, 2020.

(Continued)

*Primary Examiner* — John L Goff, II
(74) *Attorney, Agent, or Firm* — KDW Firm PLLC (57) ABSTRACT

A joining method and assembly for an aircraft. To improve the characteristics or permit hitherto impossible connections between thermoplastic and thermoset components, a multi-material joining method is disclosed in which a thermoplastic connecting region is formed on the thermoplastic component. The connecting region is connected to the thermoset component by interdiffusion. For this purpose, the uncured second component is brought into contact with the connecting region and heat is supplied. An interdiffusion layer is formed which fixedly connects the second component and the connecting region to one another and thus joins the first component to the second component.

19 Claims, 6 Drawing Sheets

(52) U.S. Cl.
CPC .......... *B29C 66/7392* (2013.01); *B33Y 80/00* (2014.12); *B29L 2031/3076* (2013.01)

(58) Field of Classification Search
CPC ........ B29C 66/221–229; B29C 66/301; B29C 66/7394; B29C 66/73116; B29C 66/30321; B29C 66/30325; B29C 66/712; B29C 65/02; B29C 65/006; B29C 64/10; B29C 64/118; B29L 2031/3076; B33Y 80/00; B33Y 10/00
See application file for complete search history.

(56) References Cited

U.S. PATENT DOCUMENTS

| | | | |
|---|---|---|---|
| 2009/0208721 | A1 | 8/2009 | Tsuchiya |
| 2009/0291279 | A1* | 11/2009 | Schroeer .................. C09J 7/38 428/323 |
| 2015/0298388 | A1 | 10/2015 | Wong |
| 2016/0271865 | A1 | 9/2016 | Iwano |
| 2021/0308956 | A1 | 10/2021 | Beier |

FOREIGN PATENT DOCUMENTS

| | | |
|---|---|---|
| EP | 3124208 A1 | 2/2017 |
| WO | 03011573 A1 | 2/2003 |

OTHER PUBLICATIONS

European Search Report for Application No. 21166527 dated Aug. 4, 2021.

\* cited by examiner

JOINING METHOD AND ASSEMBLY FOR AN AIRCRAFT

CROSS-REFERENCE TO RELATED APPLICATION

This application is a Continuation Application of U.S. patent application Ser. No. 17/219,228, filed Mar. 31, 2021, now U.S. Pat. No. 11,697,251, which claims priority to German Patent Application Serial No. 10 2020 109 740.9 filed Apr. 7, 2020, the entire disclosures of which are incorporated by reference herein.

TECHNICAL FIELD

The disclosure herein relates to a joining method for joining a, preferably fiber-reinforced, first component to a fiber-reinforced second component. The disclosure herein also relates to an assembly for an aircraft.

BACKGROUND

Fiber-reinforced components are used in aviation on account of a wide range of advantages. In order to produce relatively large assemblies, use can be made of customary joining methods such as riveting, adhesive bonding, welding and interdiffusion joining. One example of film-based interdiffusion joining (film interdiffusion joining, FIDJ) is known from EP 3 124 208 A1.

Some of the known methods can cause a high manufacturing outlay. Furthermore, not all of the methods are suitable for every type of material pairing. It may in particular be desirable for the connection to be adapted to the desired function of the components to be connected, which is typically set by the geometry and the material properties of the components. This can be difficult in the case of adhesive bonds and welded connections.

SUMMARY

The disclosure herein is based on an object of improving connections between fiber-reinforced components, preferably with regard to the load properties in the case of inhomogeneous loads.

The object is achieved by the subject matter disclosed herein.

The disclosure herein provides a joining method for joining a, preferably fiber-reinforced, first component, which contains a first polymer material as matrix, to a, preferably fiber-reinforced, second component, which contains a second polymer material as matrix, the method comprising:
a) providing the first component;
b) forming a connecting region on the first component in order to generate a joining surface on the first component, the connecting region comprising one or more thermoplastic polymer materials and being formed with at least one of the following features:
  ba) the connecting region is formed with a plurality of adjacent spatial regions, at least two adjacent spatial regions comprising different thermoplastic polymer materials; and/or
  bb) the connecting region is formed with a surface structure region which has periodic elevations and indentations in at least one direction;
c) arranging a region of the second component so as to be in contact with the joining surface and supplying heat in order to fix the connecting region to the second component, preferably with formation of an interdiffusion layer in order to join the first component to the second component.

It is preferable that, in step ba), the connecting region is formed with a first spatial region and a second spatial region.

It is preferable that the first spatial region is composed of the first polymer material and the second spatial region is composed of a thermoplastic polymer material which is different from the first polymer material.

It is preferable that the first spatial region contains short fibers and/or continuous fibers. It is preferable that the second spatial region contains short fibers and/or continuous fibers.

It is preferable that the first spatial region and the second spatial region are formed adjacently in a sheet-like layer of the connecting region, the layer being parallel to the joining surface. It is preferable that the first spatial region and the second spatial region are formed adjacently in a thickness direction of the connecting region, the direction extending normal to the joining surface.

It is preferable that, in step ba), the connecting region is formed with a plurality of first and second spatial regions. It is preferable that, as viewed in a thickness direction which extends normal to the joining surface, the extent of the first spatial regions gradually decreases with increasing distance from the first component, whereas the extent of the second spatial regions gradually increases. It is preferable that the first and second spatial regions are arranged in alternation in the thickness direction. It is preferable that the first and second spatial regions form a cellular structure and/or wave-like structure. It is preferable that the first and second spatial regions are formed, and arranged, in such a way that, in the thickness direction, there is a gradual transition from the first polymer material to the polymer material or to the polymer materials that the connecting region contains.

It is preferable that the fibers in the first spatial region extend predominantly in a first direction and the fibers in the second spatial region extend predominantly in a second direction which is different from, preferably orthogonal to, the first direction.

It is preferable that, in step ba), a spatial region is configured in the form of a core region of the connecting region, the core region being arranged in such a way that the core region encompasses merely the components and adjacent spatial regions. Preferably, the first spatial region and/or the second spatial region are/is a core region. It is preferable that the core region is composed of a, preferably fiber-reinforced, thermoplastic polymer material.

It is preferable that, in step ba), a spatial region is configured in the form of an outer edge region of the connecting region, the outer edge region being arranged in such a way that the outer edge region extends along a periphery of the connecting region and encompasses merely the components and the core region. Preferably, the first spatial region and/or the second spatial region are/is an outer edge region. It is preferable that the outer edge region is composed of a, preferably non-reinforced, thermoplastic polymer material. It is preferable that the outer edge region has a lower melting temperature than the material of the core region.

It is preferable that, in step ba), a spatial region is configured in the form of an intermediate region of the connecting region, the intermediate region being arranged between the outer edge region and the core region. Preferably, the first spatial region and/or the second spatial region are/is the intermediate region. It is preferable that the intermediate region is composed of a, preferably non-reinforced, thermoplastic polymer material. It is preferable that the polymer material is identical to the polymer material of the core region. It is preferable that the polymer material is different from the polymer material of the outer edge region. It is preferable that the polymer material has a higher melting temperature than the material of the outer edge region.

It is preferable that, in step ba), the surface structure region is formed on a side of the connecting region, the side facing away from the joining surface. It is preferable that, in step ba), in a plane parallel to the joining surface, the surface structure region is formed with elevations and indentations, which are preferably of wavelike design, and/or a corrugated or serrated pattern. It is preferable that, in step ba), the surface structure region is formed in such a way that, in a plane parallel to the joining surface, a form fit is formed between the connecting region and the first component.

It is preferable that the first polymer material is a thermoplastic polymer material or a thermosetting polymer material. It is preferable that the second polymer material is a thermosetting polymer material. It is preferable that the connecting region contains a polymer material which preferably has a lower melting temperature than the first polymer material.

It is preferable that step a) and step ba) are effected by additive manufacturing. It is preferable that step a) and step ba) are effected by additive manufacturing in such a way that first the connecting region is manufactured and subsequently the first component is manufactured.

The disclosure herein also provides an assembly, preferably for an aircraft, obtainable by implementation of a joining method as described above.

One idea is to join together components composed of composite materials which have different matrix systems. Typical components in the aviation sector are for instance clamps, clips, fastening eyes, stringers, formers, skins and the like. As in the case of the conventional methods, weight, certification, manufacturing outlay, manufacturing repeatability, damage tolerance, load capacity and the like have to be taken into account. These aspects can be improved by the disclosure herein.

By way of example, "kissing bonds" can be avoided by way of interdiffusion bonds. In the disclosure herein, there is the additional factor that the conventional methods generate a homogeneous connection, for example by way of homogeneous material properties and geometries, at points which are generally subjected to inhomogeneous loading. The elongation in the substrates can thus lead to local stress increases in the edge regions or peel loads as a result of eccentric loading.

One proposal is to utilize the interdiffusion of multiple materials, which can be referred to as multi-material interdiffusion joining ($M^2IDJ$). This type of connection can preferably be generated by additive manufacturing by filament layer manufacturing (FLM). The connection permits an increased load capacity and damage tolerance. At the same time, the structural weight and the manufacturing outlay can be reduced.

The use of multiple materials and the superior capabilities of 3D printing to realize virtually any desired geometries make it possible to adapt the structure of the connecting region and interdiffusion zones to the expected load scenarios in advance. $M^2IDJ$ can, on the one hand, be implemented on the conventional film geometry or for connecting 3D-printed thermoplastic components to thermoset components.

For adaptation purposes, it is possible to vary, inter alia, the following parameters:
  thermoplastics with different solubility in the thermoset matrix
  thermoplastics with different material strength and stiffness
  thermoplastics with high/low fracture toughness
  microadditives (particles) and macroadditives (fibers)
  material connection zone architecture (material design, film thickness, porosity, production route, reorientation of additives)

Typically used thermoplastics are high-performance thermoplastics, for example polyaryletherketones (PAEK), such as polyetheretherketone (PEEK) and polyetherketoneketone (PEKK). Examples of thermoplastics with a relatively low melting temperature are polyetherimides (PEI), blends composed of PEI and polycarbonate (PC), thermoplastic polyurethane (TPU), and also polyamides. Typical thermoset systems are epoxy resins, for example. The thermoplastics can preferably contain fill material, for example particles or fibers (both short fibers and continuous fibers).

The connection can be adapted to shearing, peeling, tearing, cleavage and the like in various manners. In the case of inhomogeneous join loading, such as shearing, peeling, cleavage, the relevant module can be adapted. For stresses of this kind, it is thus possible for additives (for example fibers, particles) to be embedded in the thermoplastic in order to increase, for example, the shear modulus in the direction of the expected loading. The fibers can in this case extend in different preferred directions. It is also conceivable to use a preferably structured multi-matrix.

A further adaptation possibility is edge strengthening, in the case of which, for example in an edge region of the connecting region, the fiber orientation is adapted, or merely the pure matrix or a tougher matrix is applied.

A further measure may be to locally apply tough particles/lines/patterns, with the aim of bridging cracks. Furthermore, it is possible to provide pores or poorly bonded fibers in order to pin cracks. The pores can also function as crack arrestors. A further idea is for a tough matrix with bonding to the main matrix to be locally provided in order to deflect the crack path. A preferred refinement can contain microparticles or other additives—for example rubber particles or TPU—in order to distribute, and thus reduce, shear forces. Another refinement can contain high-modulus additives, such as graphite, carbon nanotubes or carbon black, for prevention of microcracks.

A further idea is for highly tough local phases composed of thermoplastic having a melting temperature below the infusion temperature to be provided for the purpose of bonding to textile parts or preforms. Furthermore, a perforation can be provided in the connecting region as an infusion aid.

For bonding of polymers of different types, a transition phase or a transition region can be formed in the connecting region. Ideally, the transition has a gradual cellular geometry. Crossovers between different material phases are also possible. By way of example, it is possible to initially print PEI as a connecting region, and subsequently PEEK for the actual component. In this case, the two materials can be locally fused on account of the relatively high melting temperature of PEEK.

A further idea is for the connecting region to be provided with a surface structure, by which the connecting region is connected to the component, whereas the joining surface remains smooth. The surface structure can advantageously be generated by additive manufacturing.

BRIEF DESCRIPTION OF THE DRAWINGS

Example embodiments will be explained in more detail with reference to the appended schematic drawings, in which.

DETAILED DESCRIPTION

Figure 1:
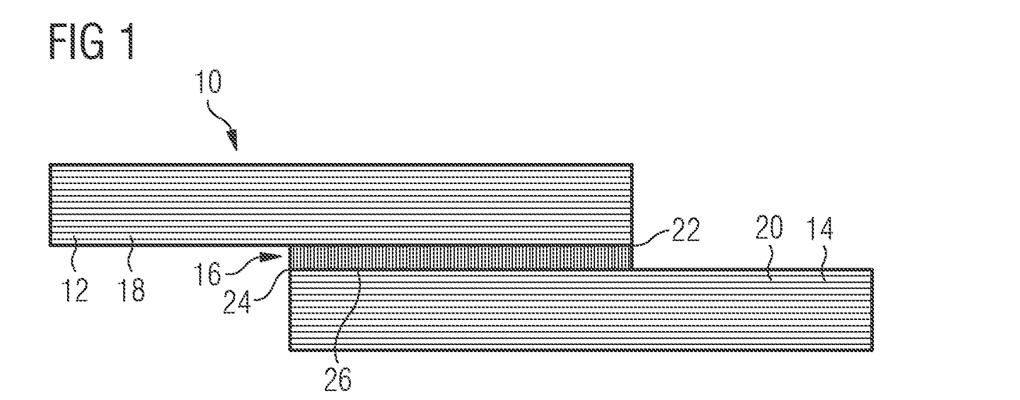
FIG. 1 through FIG. 8 show example embodiments of an assembly.

Reference is first of all made to FIG. 1, which shows an assembly 10. The assembly 10 comprises a first component 12 and a second component 14, which are connected to one another via a connecting region 16.

The assembly 10 is for example intended for an aircraft. The first component 12 can be a reinforcing component, for instance a stringer. The second component 14 can be a fuselage component, for example an outer skin which is intended to be reinforced by the first component 12.

The first component 12 is a fiber-reinforced component which contains a matrix composed of a first polymer material 18. The first polymer material 18 is selected from the group of polyaryletherketones, for example PEEK.

The second component 14 is a fiber-reinforced component which contains a matrix composed of a thermosetting second polymer material 20. The second polymer material 20 is for example epoxy resin.

The connecting region 16 is composed of a thermoplastic polymer material, for example PEI. The connecting region 16 can be configured in the form of a film or in the form of a foil.

The first component 12 and the connecting region 16 are fused together at a melt layer 22. This can be achieved for example in that the first component 12 is additively manufactured on the connecting region 16.

The connecting region 16 also has a joining surface 24 which preferably lies opposite the melt layer 22.

The second component 14 is arranged with a region in contact with the joining surface 24. In this state, the second polymer material 20 is still in the curable state. Heat is then supplied in order to heat the first polymer material 18 above its glass transition temperature and to activate the curing of the second polymer material 20. In this case, an interdiffusion layer 26 is produced between the second component 14 and the connecting region 16. The connecting region 16 is then fixed to the second component 14, and therefore overall the first component 12 and the second component 14 have been joined to form the assembly 10.

The further example embodiments are explained merely insofar as they differ from the example described above.

Figure 2:
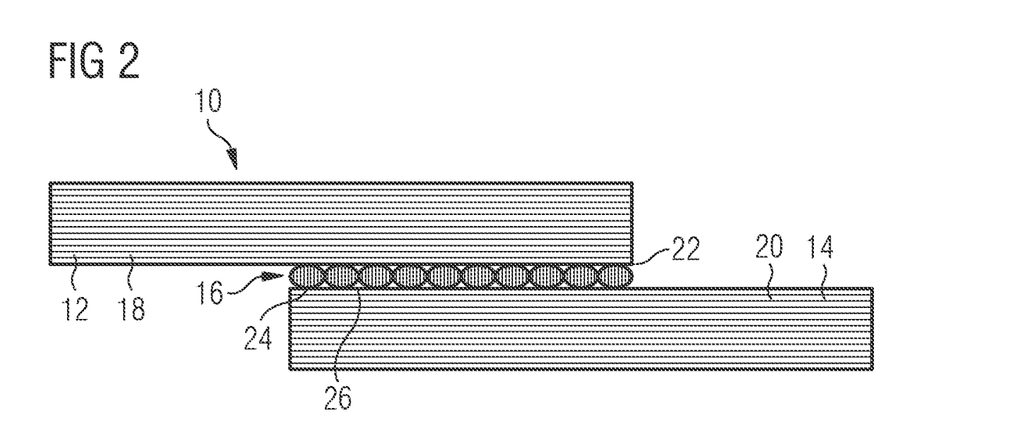

As indicated in FIG. 2, the connecting region 16, similarly to the first component 12, is generated by additive manufacturing. In the sequence, the connecting region 16 is initially generated and then the first component 12 is constructed on the connecting region 16. The method then proceeds as described above.

Figure 3:
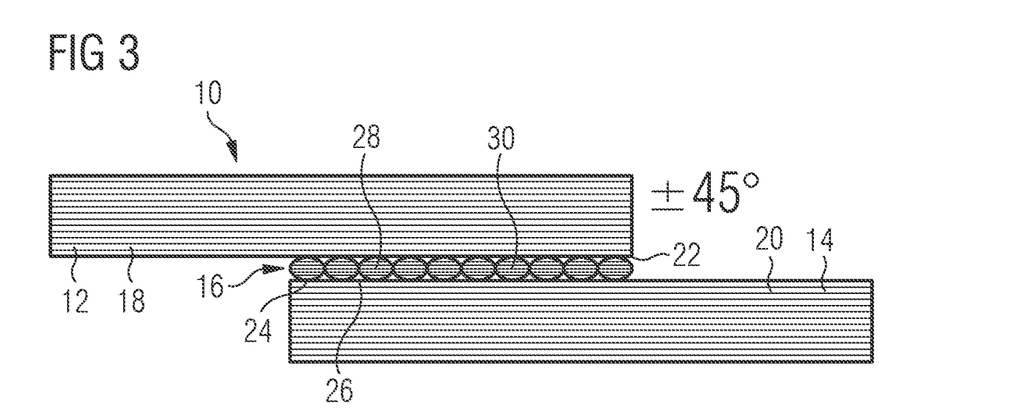

FIG. 3 shows a connecting region 16 which is additively manufactured from a fiber-reinforced thermoplastic first polymer material 18, for example fiber-reinforced PEI. The fibers are for example continuous fibers and can be arranged at angles of +45° and −45°.

It is also possible for the connecting region 16 to contain more than one layer, with a fiber direction that alternates in each case from layer to layer. Accordingly, the connecting region 16 has a first spatial region 28 with a first fiber direction and a second spatial region 30 with a second fiber direction, which may be orthogonal to the first fiber direction. The method then proceeds as described above.

It should be noted that the second spatial region 30 is considered to be composed of a different polymer material compared with the first spatial region 28 because the fibers extend in another direction.

Figure 4:
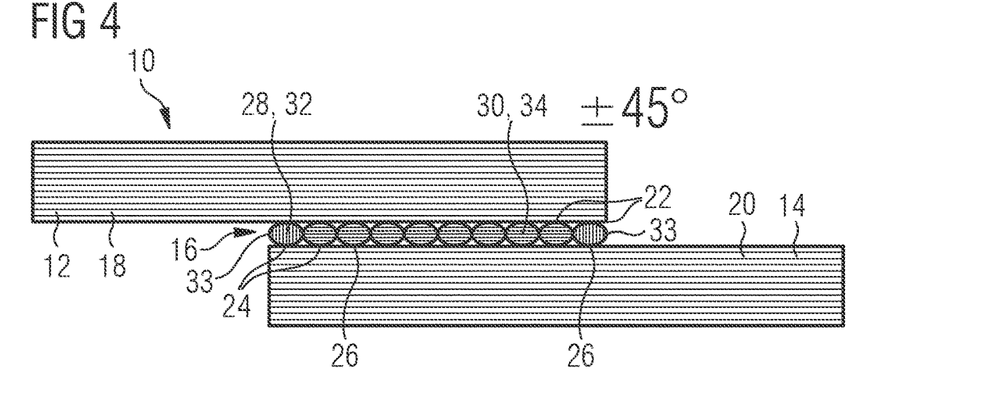

FIG. 4 shows a connecting region 16 which is additively manufactured. The connecting region 16 contains a first spatial region 28 and a second spatial region 30.

The first spatial region 28 is configured in the form of an outer edge region 32. The outer edge region 32 has an exposed side 33. The outer edge region 32 is for example composed of non-reinforced thermoplastic, such as PEI.

The second spatial region 30 is configured in the form of a core region 34. The core region 34 adjoins the outer edge region 32, the first component 12 and the second component 14. The core region 34 is for example composed of fiber-reinforced thermoplastic, such as PEI. The core region 34 can have different fiber directions, as described above.

Figure 5:
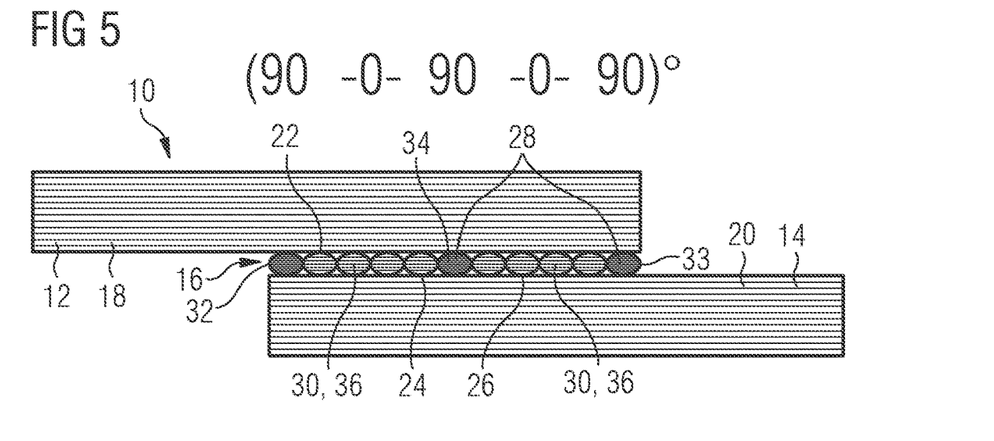

FIG. 5 shows a connecting region 16 which is additively manufactured. The connecting region 16 contains a first spatial region 28 and a second spatial region 30.

The first spatial region 28 is configured in the form of an outer edge region 32 and in the form of a core region 34. The first spatial region 28 is for example composed of a fiber-reinforced thermoplastic such as PEI, wherein the fibers extend at an angle of 90° relative to the first component 12 or the second component 14.

The second spatial region 30 is configured in the form of an intermediate region 36 which is arranged between the outer edge region 32 and the core region 34. The second spatial region 30 is for example composed of a fiber-reinforced thermoplastic such as PEI.

In contrast to the first spatial region 28, the fibers extend at an angle of 0°. It should be noted that the second spatial region 30 is considered to be composed of a different polymer material compared with the first spatial region 28 because the fibers extend in another direction.

Figure 6:
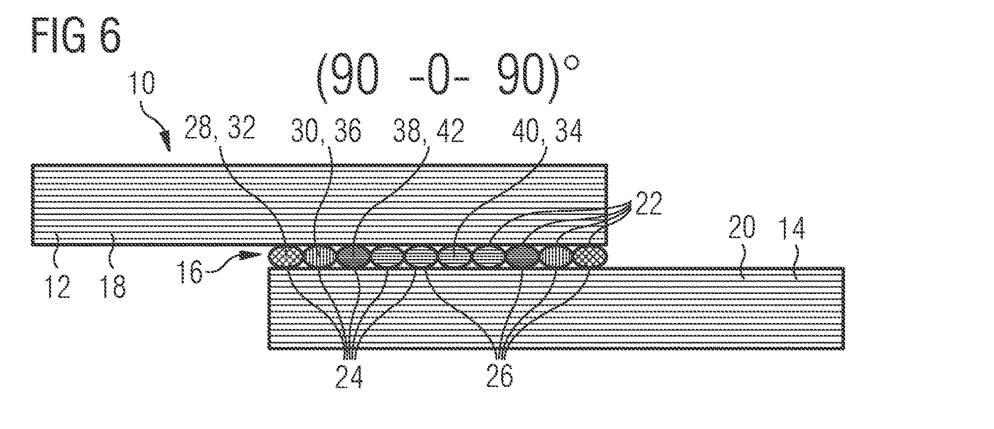

FIG. 6 shows a connecting region 16 which is additively manufactured. The connecting region 16 contains a first spatial region 28, a second spatial region 30, a third spatial region 38 and a fourth spatial region 40.

The first spatial region 28 is configured in the form of an outer edge region 32. The outer edge region 32 is composed of a non-reinforced thermoplastic polymer material, for example polyamide or thermoplastic polyurethane, wherein the polymer material has a low melting temperature.

The second spatial region 30 is configured in the form of an intermediate region 36. The intermediate region 36 is composed of a non-reinforced thermoplastic polymer material such as PEI. The intermediate region 36 has a higher melting temperature than the outer edge region 32.

The third spatial region 38 is configured in the form of a further intermediate region 42 which is arranged between the intermediate region 36 and the core region 34. The further intermediate region 42 is composed of a fiber-reinforced thermoplastic polymer material such as PEI, in which the fibers extend at an angle of 90°.

The fourth spatial region 40 is configured in the form of a core region 34. The core region 34 is composed of a fiber-reinforced thermoplastic polymer material such as PEI, in which the fibers extend at an angle of 0°.

Figure 7:
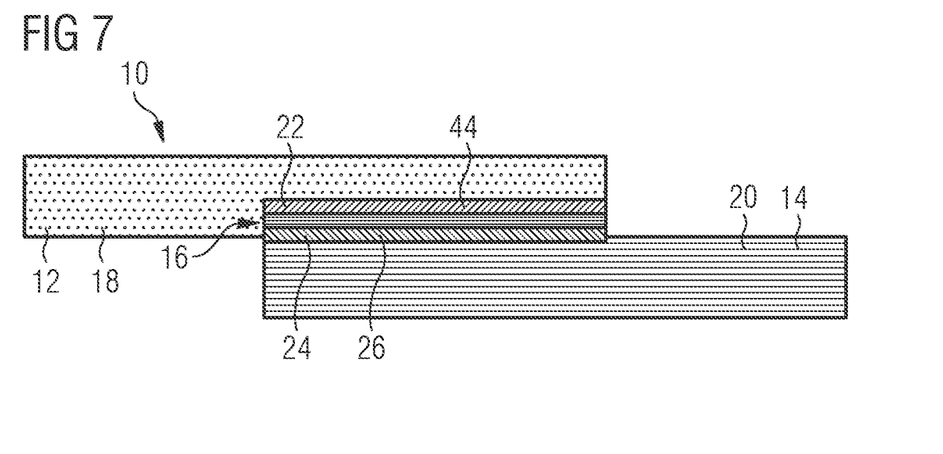

FIG. 7 shows a connecting region 16 which is additively manufactured. The connecting region 16 is formed with a surface structure region 44 on which the melt layer 22 is formed. The surface structure region 44 is structured such that a form fit is generated in a plane parallel to the joining surface 24. The surface structure region 44 can have periodically alternating elevations 46 and indentations 48. The surface structure region 44 can be configured in a wavelike manner, with a grooved or serrated pattern and/or the like.

Figure 8:
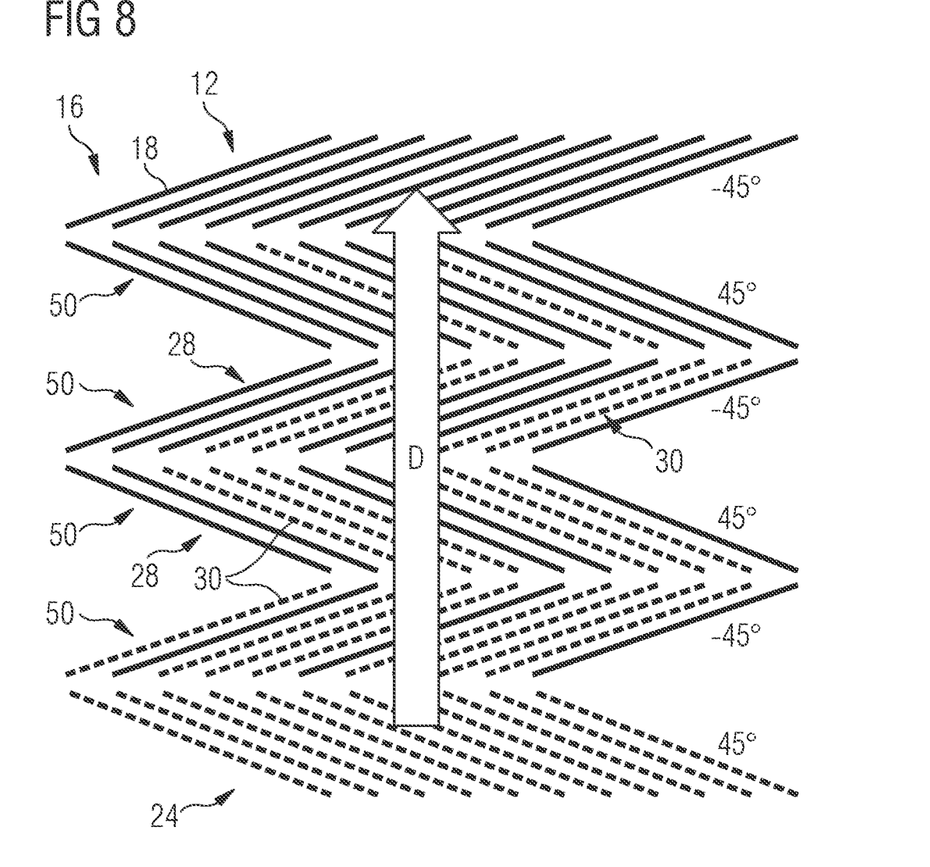

FIG. 8 shows a connecting region 16 which is additively manufactured. The connecting region 16 is formed such that, in the thickness direction D, there is a gradual transition between the polymer material of the connecting region 16 and the first polymer material 18. By way of example, a plurality of polymer layers 50 are generated, wherein the proportion of polymer lines composed of the first polymer material 18 increases layer by layer. The first spatial region 28 and the second spatial region 30 are produced by the various polymer lines.

Figure 9:
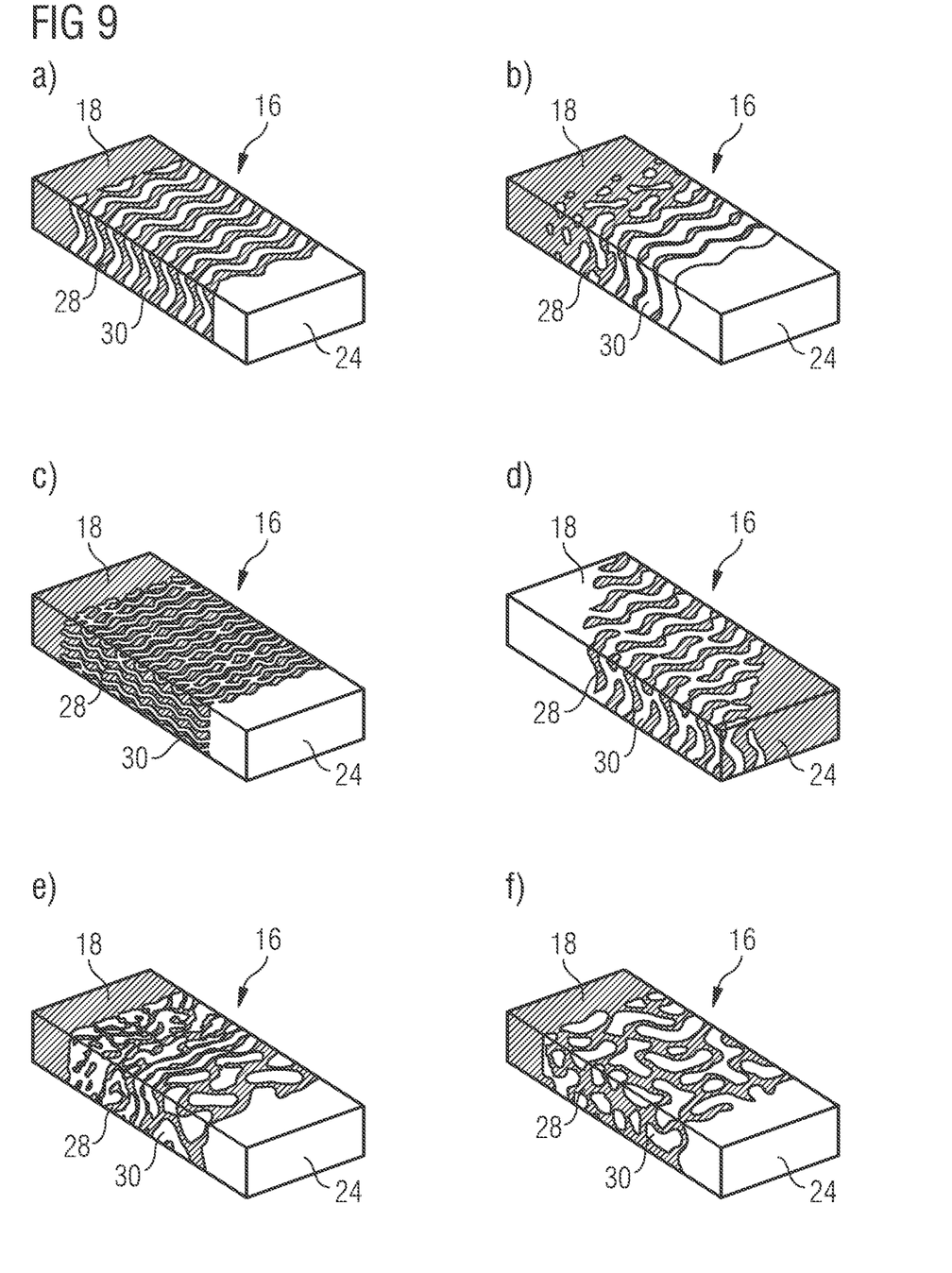
FIG. 9 shows detail views (a) through (f) of different examples of connecting regions.

FIG. 9 shows further examples of such a system composed of polymer layers 50 with the first spatial region 28 and the second spatial region 30. The transition can be designed in the form of a cellular structure or regions which are arranged periodically in alternation, as are illustrated in FIG. 9.

Figure 10:
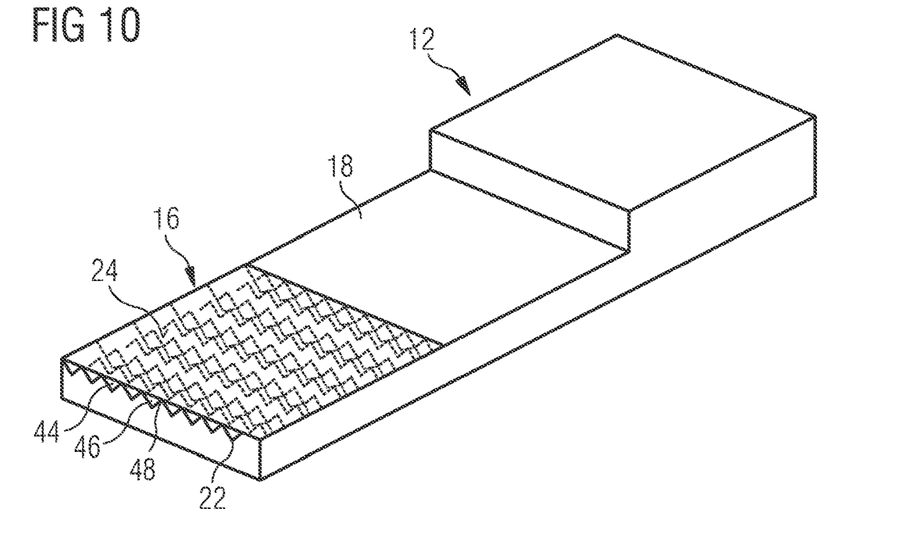
FIG. 10 through FIG. 13 show an example embodiment of a joining method.
Figure 11:
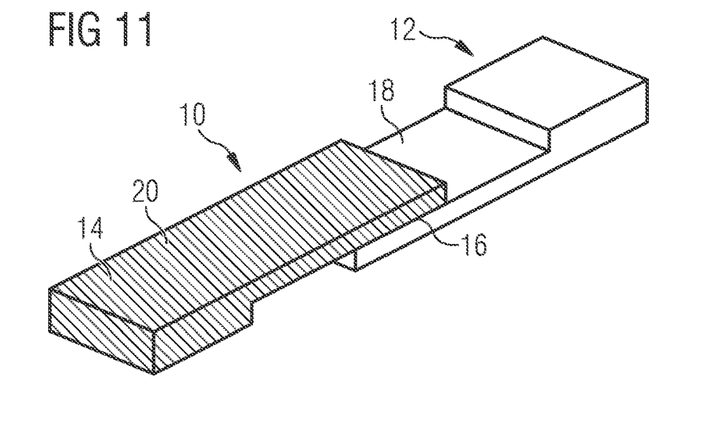
Figure 12:
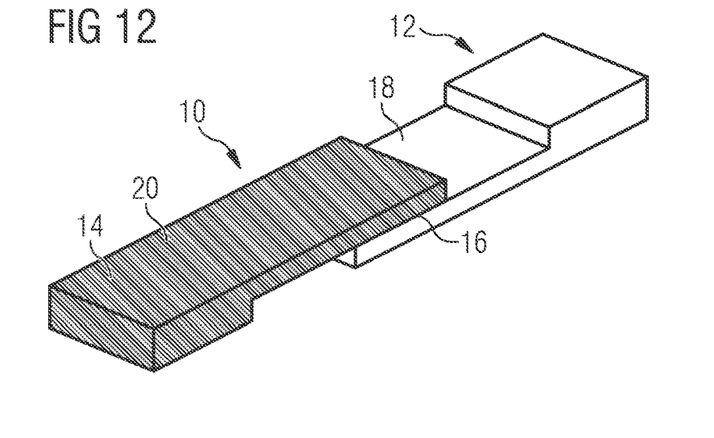

The joining method is elucidated with reference to FIG. 10 to FIG. 12. The first component 12 is initially provided with the connecting region 16. The provision can be effected in that the first component 12 and the connecting region 16 are additively manufactured. Preferably, the connecting region 16 is manufactured first or at the same time as the first component 12. The connecting region 16 is configured in any, or an expedient, combination of the examples described above.

Looking at FIG. 11, a region of the second component 14 is brought into contact in the uncured state with the joining surface 24. The second component 14 can be a textile preform, a carbon fiber-reinforced plastics part or the like. If required, the second component 14 is infused in the position.

Figure 13:
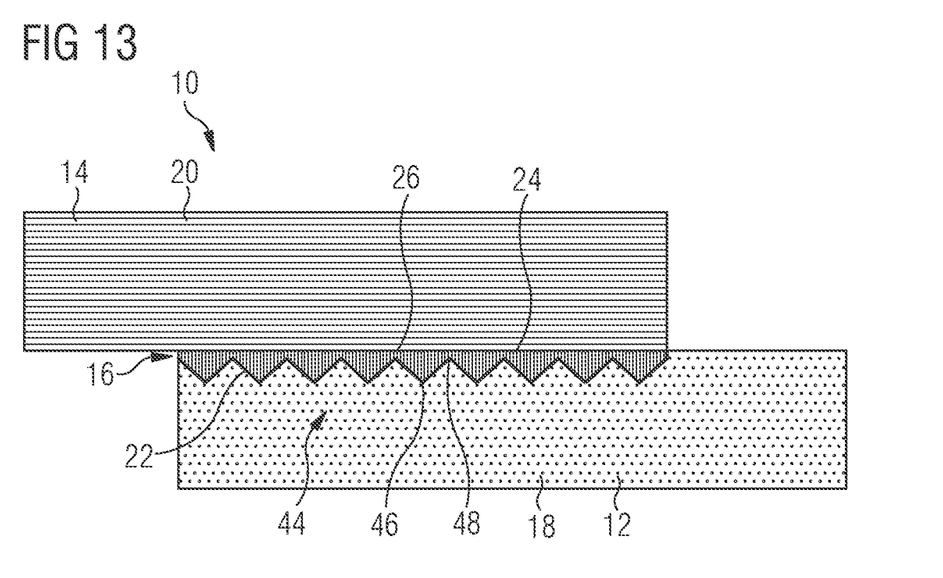

As illustrated in FIG. 12, the assembly 10 is subsequently finished by supply of heat. The first component 12 is then joined to the second component 14 to form the assembly 10, which is schematically illustrated in FIG. 13.

In order to improve the characteristics or permit hitherto impossible connections between thermoplastic and thermoset components 12, 14, a multi-material joining method is proposed in which a thermoplastic connecting region 16 is formed on the thermoplastic component 12. The connecting region 16 is connected to the thermoset component 14 by interdiffusion. For this purpose, the uncured second component 14 is brought into contact with the connecting region 16 and heat is supplied. An interdiffusion layer 26 is formed which fixedly connects the second component 14 and the connecting region 16 to one another and thus joins the first component 12 to the second component 14.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

10 Assembly
12 First component
14 Second component
16 Connecting region
18 First polymer material
20 Second polymer material
22 Melt layer
24 Joining surface
26 Interdiffusion layer
28 First spatial region
30 Second spatial region
32 Outer edge region
33 Exposed side
34 Core region
36 Intermediate region
38 Third spatial region
40 Fourth spatial region
42 Further intermediate region
44 Surface structure region
46 Elevation
48 Indentation
50 Polymer layer
D Thickness direction

The invention claimed is:

1. A joining method for joining together a fiber-reinforced first component, which contains a first polymer material as a matrix, to a fiber-reinforced second component, which contains a curable thermosetting second polymer material as a matrix, the method comprising:
   providing the first component;
   forming a connecting region on the first component to generate a joining surface on the first component, the connecting region comprising thermoplastic polymer materials and being formed with a plurality of adjacent spatial regions, wherein two adjacent spatial regions each comprise different thermoplastic polymer materials from each other;
   forming, for the connecting region, a plurality of first and second spatial regions, wherein the first spatial regions and the second spatial regions extend in a thickness direction of the connecting region, which is normal to the joining surface of the connecting region, and are arranged alternately in the thickness direction; and
   arranging a portion of the second component in contact with the joining surface and applying heat to fix the connecting region to the second component while curing the second polymer material to join the second component and the first component together;
   wherein the first spatial regions comprise fibers;
   wherein all of the fibers in the first spatial regions extend predominantly in a first direction;
   wherein the second spatial regions comprise fibers; and
   wherein all of the fibers in the second spatial regions extend predominantly in a second direction, which is orthogonal to the first direction.

2. The joining method of claim 1, wherein:
   the connecting region is formed with a surface structure region, which has periodic elevations and depressions in at least one direction; and/or
   the first spatial regions and/or the second spatial regions contain short fibers and/or continuous fibers.

3. The joining method of claim 2, wherein:
the first and second spatial regions extend in the thickness direction; and
in forming the connecting region an extent of the first spatial regions in the thickness direction gradually decreases with increasing distance from the first component, while an extent of the second spatial regions gradually increases.

4. The joining method of claim 2, wherein, in forming the connecting region, the first and second spatial regions form a cellular structure.

5. The joining method of claim 2, wherein, in forming the connecting region, the first and second spatial regions form a wavelike structure.

6. The joining method of claim 1, wherein, in forming the connecting region, one of the spatial regions is configured in a form of a core region of the connecting region, the core region being arranged to adjoin the first and second components and adjacent spatial regions.

7. The joining method of claim 6, wherein the core region comprises a fiber-reinforced, thermoplastic polymer material.

8. The joining method of claim 6, wherein:
the core region comprises a fiber-reinforced, thermoplastic polymer material; and/or
in forming the connecting region, another one of the spatial regions is formed in an outer edge region of the connecting region, the outer edge region being arranged such that the outer edge region extends along a periphery of the connecting region and only adjoins the first and second components and the core region.

9. The joining method of claim 8, wherein:
the outer edge region comprises a non-reinforced, thermoplastic polymer material; and/or
the outer edge region has a lower melting temperature than the material of the core region.

10. The joining method of claim 6, wherein:
in forming the connecting region, another one of the spatial regions is formed in an outer edge region of the connecting region, the outer edge region being arranged such that the outer edge region extends along a periphery of the connecting region and adjoins the first and second components and the core region; and
a spatial region is formed as an intermediate region of the connecting region, the intermediate region being arranged between the outer edge region and the core region.

11. The joining method of claim 10, wherein the intermediate region comprises a non-reinforced, thermoplastic polymer material which:
is, with exception of fiber direction, identical to the polymer material of the core region, and/or
is different from the polymer material of the outer edge region, and/or has a higher melting temperature than the material of the outer edge region.

12. The joining method of claim 1, wherein, in forming the connecting region:
a surface structure region is formed on a side of the connecting region facing away from the joining surface; and
in a plane parallel to the joining surface, the surface structure region comprises elevations and depressions that are of wavelike design and/or a corrugated or serrated pattern.

13. The joining method of claim 12, wherein the surface structure region is formed such that, in the plane parallel to the joining surface, a form fit is formed between the connecting region and the first component.

14. The joining method of claim 1, wherein:
the first polymer material is a thermoplastic polymer material or a thermosetting polymer material; and/or
the connecting region contains a polymer material, which has a lower melting temperature than the first polymer material.

15. The joining method of claim 1, wherein the first component and the connecting region are formed by additive manufacturing such that the connecting region is manufactured first and then the first component is manufactured.

16. An aircraft assembly formed according to the joining method of claim 1.

17. A joining method for joining together fiber-reinforced first and second components, the method comprising:
forming a connecting region, which comprises a plurality of adjacent spatial regions, including at least a first spatial region and a second spatial region that are laterally adjacent to, and coplanar with, each other, in a manner of a planar layer, and, in each case, the first and second spatial regions comprise fibers and have different thermoplastic polymer materials from each other;
forming, via additive manufacturing, a first fiber-reinforced component, which comprises a first polymer material as matrix, on the connecting region, such that the connecting region and the first component are attached together to provide a joining surface on the first component;
forming a fiber-reinforced second component, which comprises a curable thermosetting second polymer material as matrix; and
arranging, after the connecting region and the first component are attached together, a region of the second component in contact with the joining surface and supplying heat to fix the connecting region to the second component while curing the second polymer material to join the first component to the second component;
wherein all of the fibers in the first spatial region extend predominantly in a first direction and all of the fibers in the second spatial region extend predominantly in a second direction, the second direction being orthogonal to the first direction.

18. The joining method of claim 17, wherein, in forming the connecting region:
the first spatial region comprises the first polymer material and the second spatial region comprises a thermoplastic polymer material, which is different from the first polymer material; and/or
the first spatial region and/or the second spatial region contain short fibers and/or continuous fibers; and/or
the first spatial region and the second spatial region form, together, a sheet-like layer for the connecting region, the layer extending parallel to the joining surface.

19. The joining method of claim 17, wherein:
in forming the connecting region, one of the spatial regions is configured in a form of a core region of the connecting region, the core region being arranged to adjoin the first and second components and adjacent spatial regions; and
either:
the core region comprises a fiber-reinforced, thermoplastic polymer material; or
in forming the connecting region, another one of the spatial regions is configured in a form of an outer edge region of the connecting region, the outer edge region being arranged such that the outer edge region extends along a periphery of the connecting region and adjoins the first and second components and the core region.

* * * * *